(12) United States Patent
Medina et al.

(10) Patent No.: US 11,255,651 B2
(45) Date of Patent: Feb. 22, 2022

(54) LEVELING DEVICE FOR HANGING PICTURE FRAMES

(71) Applicants: Donald Arthur Medina, Lake Havasu, AZ (US); Nelson O. Broce, Jr., Lake Havasu, AZ (US)

(72) Inventors: Donald Arthur Medina, Lake Havasu, AZ (US); Nelson O. Broce, Jr., Lake Havasu, AZ (US)

(73) Assignees: Donald Arthur Medina, Lake Havasu, AZ (US); Nelson O. Broce, Jr., Lake Havasu, AZ (US)

( * ) Notice: Subject to any disclaimer, the term of this patent is extended or adjusted under 35 U.S.C. 154(b) by 173 days.

(21) Appl. No.: 16/452,533

(22) Filed: Jun. 26, 2019

(65) Prior Publication Data
US 2020/0408498 A1    Dec. 31, 2020

(51) Int. Cl.
| | |
|---|---|
| *G01B 5/25* | (2006.01) |
| *G01B 3/04* | (2006.01) |
| *G01C 9/34* | (2006.01) |
| *G01C 9/28* | (2006.01) |
| *G01B 11/26* | (2006.01) |

(52) U.S. Cl.
CPC .............. *G01B 3/04* (2013.01); *G01C 9/28* (2013.01); *G01C 9/34* (2013.01); *G01B 11/26* (2013.01)

(58) Field of Classification Search
CPC . G01B 3/04; G01B 3/008; G01B 5/24; G01B 5/25; G01C 9/28
USPC ............................ 33/415, 613, 645, 484, 485
See application file for complete search history.

(56) References Cited

U.S. PATENT DOCUMENTS

| | | | | |
|---|---|---|---|---|
| 4,241,510 A * | 12/1980 | Radecki | ................. | A47G 1/205 33/451 |
| 6,029,362 A * | 2/2000 | Miodragovic | ........... | B25H 7/00 33/483 |
| 6,357,716 B1 * | 3/2002 | Kratish | ................... | A47G 1/205 248/466 |
| 6,421,928 B1 * | 7/2002 | Miller | .................... | A47G 1/205 33/520 |
| 6,463,666 B1 * | 10/2002 | Szumer | .................... | G01B 3/02 33/451 |
| 6,473,983 B1 * | 11/2002 | Gier | ....................... | A47G 1/205 33/613 |
| 7,469,480 B2 * | 12/2008 | Nottingham | ......... | G01C 15/002 33/286 |
| 7,886,447 B2 * | 2/2011 | Cruz | ...................... | B26B 29/06 33/41.5 |

(Continued)

*Primary Examiner* — George B Bennett
(74) *Attorney, Agent, or Firm* — Bayramoglu Law Offices LLC

(57) ABSTRACT

A device includes a ruler, a leveling device attached to the ruler and a plurality of pins. The device only requires one person to hang level pictures, paintings, frames and other wall hanging objects. The ruler is a made from a rigid material and has a plurality of holes therein where the pins are inserted. The ruler has a fixed length or has a telescopic structure. The plurality of holes formed in the ruler are spaced apart from one another and the spacing is uniform or variable spacing. The leveling device is a bubble leveler including three bubble levels where one bubble level is horizontally positioned, another bubble level is vertically positioned, and the third bubble level has an angle relative to the horizontally positioned bubble level. The plurality of pins include a threaded pointed screw with a knob attached to one end of the screw.

17 Claims, 7 Drawing Sheets

(56) References Cited

U.S. PATENT DOCUMENTS

| | | | | |
|---|---|---|---|---|
| 8,117,760 B1* | 2/2012 | Revell | | G01B 3/08 |
| | | | | 33/458 |
| 8,261,462 B2* | 9/2012 | Coyle | | A47G 1/205 |
| | | | | 33/613 |
| 8,347,518 B1* | 1/2013 | Martinez | | A47G 1/205 |
| | | | | 33/613 |
| 10,194,760 B2* | 2/2019 | Frazier, Jr. | | A47G 1/205 |
| 10,524,592 B2* | 1/2020 | Sergyeyenko | | A47G 1/24 |
| 10,716,416 B1* | 7/2020 | Harrington | | G01C 9/24 |
| 2002/0078583 A1* | 6/2002 | Richardson | | A47G 1/205 |
| | | | | 33/613 |
| 2002/0095812 A1* | 7/2002 | Newman | | B25H 7/04 |
| | | | | 33/613 |
| 2002/0095813 A1* | 7/2002 | Tatarnic | | G01C 9/28 |
| | | | | 33/613 |
| 2002/0124426 A1* | 9/2002 | Dewberry | | G01B 3/04 |
| | | | | 33/494 |
| 2002/0184780 A1* | 12/2002 | Voorhees | | A47G 1/205 |
| | | | | 33/613 |
| 2003/0051363 A1* | 3/2003 | Hofmeister | | A47G 1/205 |
| | | | | 33/613 |
| 2004/0049936 A1* | 3/2004 | Newman | | B25H 7/04 |
| | | | | 33/613 |
| 2008/0196262 A1* | 8/2008 | Bommarito | | A47G 1/205 |
| | | | | 33/613 |
| 2009/0188121 A1* | 7/2009 | Rabin | | G01C 9/26 |
| | | | | 33/332 |
| 2010/0116964 A1* | 5/2010 | Aleo | | A47G 1/164 |
| | | | | 248/476 |
| 2012/0246957 A1* | 10/2012 | Daniel | | G01C 9/24 |
| | | | | 33/645 |
| 2015/0047214 A1* | 2/2015 | Chernyshou | | B43L 7/02 |
| | | | | 33/479 |
| 2017/0370718 A1* | 12/2017 | Block | | G01C 9/34 |
| 2018/0372467 A1* | 12/2018 | Yokoyama | | G01B 3/04 |
| 2019/0339052 A1* | 11/2019 | Vuylsteke | | G01B 3/02 |

\* cited by examiner

LEVELING DEVICE FOR HANGING PICTURE FRAMES

TECHNICAL FIELD

The present invention relates to the technical field of the installation of level objects. More specifically, the present invention relates to a device for the level installation of pictures, paintings, frames and other wall hanging objects.

BACKGROUND

Many known systems and apparatuses for hanging level picture frames on a wall or on a surface of a structure require complex systems and devices. Further, these systems and apparatuses require more than one person to hang the picture frame on the wall or on the surface of a structure.

Currently, some frames for pictures, paintings or other wall hangings come with pre-drilled holes or other fastening devices attached thereto. Since these pre-drilled holes are located on the side of the frame, which is to be mounted to a wall, it is difficult to hang the frame with the pre-drilled holes to a wall since one cannot view the frame fastening device and the pre-drilled holes simultaneously. This results in multiple failed attempts to hang the frame and many failed attempts to hang the frame level on the wall. These failed attempts result in unwanted holes in the wall.

Therefore, there is a need for hanging level objects on a wall or on a surface of a structure which only requires a single person and is hassle free, uses a simple and inexpensive apparatus, the apparatus is easy to use and allows for quick and accurate level hanging of pictures, paintings, frames and other wall hanging objects.

The present invention solves the above mentioned problems of the prior art hanging systems and apparatuses by providing a device and method which only requires one person to hang level pictures, paintings, frames and other wall hanging objects and the device is inexpensive, easy and simple to use and manufacture and the device enables a quick and accurate level installation of the pictures, paintings, frames and other wall hanging objects.

SUMMARY

The objective of the present invention is to provide a level installation device and method which solves the problems of the above-mentioned prior art.

In order to achieve the above objective, the present invention is a device which includes a ruler, a leveling device attached to the ruler and a plurality of pins.

One example of the device operating to hang level objects such as pictures, paintings and frames on a wall or on a surface of a structure is screwing the threaded pointed screw portion of the pin or pins into a threaded measuring hole or holes until the threaded pointed screw portion makes contact with a surface of the wall or a surface of a structure such that the threaded pointed screw portion makes a visible mark/marking on the wall or the surface of the structure.

The device is used to hang level objects such as pictures, paintings and frames on a wall or on a surface of a structure by inserting at least one pin into at least one measuring hole in the ruler such that the pin makes contact with and leaves a visible mark/marking on a surface of the wall or the surface of a structure. In an embodiment, the tip of the pins may have a means for marking the wall or the surface of a structure so as to leave a colored or darkened mark on the surface of the wall or the surface of the structure. Some examples of the means for marking are lead, paint, graphite or other material for marking.

The ruler is made from a rigid material, has a plurality of measuring holes therein and is provided with markings which allows for a distance to be measured and determined. For example, the ruler's rigid material is an alloy, a metal, a plastic, wood or a composite material. The rigid materials are manufactured by extruding, machining or other methods.

The ruler has a fixed length or has a telescopic structure. The fixed length of the ruler is 48 inches but can be shorter or longer than 48 inches as per the use of the device. Similarly, the ruler can telescope (i.e. extend) from a length of a few inches up to ten feet.

The plurality of measuring holes formed in the ruler have threads on the inner surface of the measuring holes or the measuring holes can have a smooth (i.e. not have threads) inner surface.

The plurality of measuring holes formed in the ruler are spaced apart from one another. The spacing of the plurality of measuring holes have a uniform spacing or can have variable spacing. For example, with a uniform spacing of the plurality of measuring holes, the distance from the center of one measuring hole to the center of an adjacent measuring hole is ¼ inch or can be smaller or larger depending on the needed application. If the spacing of the plurality of measuring holes is variable, then the distance from the center of one measuring hole to the center of an adjacent measuring hole is ¼ inch or can be smaller or larger depending on the needed application and another distance between two different adjacent measuring holes is ⅛ inch or can be smaller or larger depending on the needed application. In another embodiment, the measuring holes can merge into one guiderail aperture whereby the pins may slide and lock into place and the pins can then be put in contact with the wall or surface and leave either a physical mark or a colored or darkened mark.

The ruler markings are in inches, millimeters, centimeters or any other measurement system.

Preferably, material of the ruler is present between each of the plurality of measuring holes.

The leveling device attached to the ruler is a bubble leveler, a laser leveler or another type of leveler. The leveling device is attached to the ruler with a screw or screws, a rivet or rivets or other fastener(s) fastened into a fastening hole or fastening holes in the ruler.

The fastening hole or fastening holes have threads on the inner surface or can have a smooth (i.e. not have threads) inner surface.

Preferably, the leveling device is attached to the ruler with glue, adhesive, epoxy, a dove-tail connection or other fastening devices.

Preferably, the bubble leveler has one bubble level or a plurality of bubble levels. The plurality of bubble levels may be three bubble levels where one bubble level is horizontally positioned, another bubble level is vertically positioned, and the third bubble level is positioned at an angle relative to the horizontally positioned bubble level.

The angle relative to the horizontally positioned bubble level is 45 degrees or can be smaller or larger than 45 degrees depending on the application.

Each pin of the plurality of pins includes a threaded or non-threaded pointed screw with a knob attached to one end of the screw. The knob is integrally attached to one end of the pointed screw or the knob may have a female end attached to a male end of the pointed screw. The knob has an upper end and a lower end. The upper end of the knob has a diameter which is larger than a diameter of the lower end of the knob.

Figure 1:
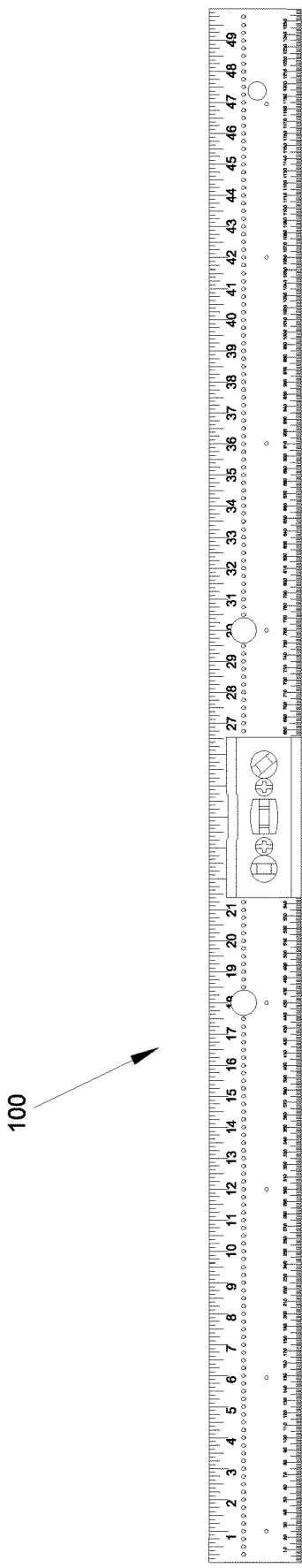
FIG. 1 is a structural illustration of a device according to an embodiment of the present invention.

In the drawings,
100—device 1—ruler; 2—leveling device; 3—bubble levels; 4—pin; 5—measuring hole; 6—measuring hole threads; 7—fastening hole; 8—fastening hole threads; 9—threaded pointed screw; 10—knob; 11—knob upper end; 12—knob lower end; 13—markings; 14—screw; 15—telescoping structure of the ruler; 16—tip of a pin; 17—means for marking; 18—guiderail aperture.

DETAILED DESCRIPTION OF THE EMBODIMENTS

The technical solutions of the embodiments of the present invention are described clearly and completely hereinafter with reference to the drawings in the embodiments of the present invention. Obviously, the described embodiments are merely a part of embodiments according to the invention, rather than all embodiments. All other embodiments made by those of ordinary skill in the art without creative work based on the embodiments of the present invention should also be considered as falling within the scope of the present invention.

Embodiment of the Invention

The present invention provides device 100 as shown in FIG. 1 through FIG. 6. The device includes ruler 1, leveling device 2 attached to the ruler and a plurality of pins 4.

The device is used to hang level objects such as pictures, paintings and frames on a wall or on a surface of a structure by inserting at least one pin into at least one measuring hole in the ruler such that the pin(s) make(s) contact with and a leaves a visible mark/marking on a surface of the wall or the surface of a structure.

The ruler is made from a rigid material, has a plurality of measuring holes 5 therein and is provided with markings 13 which allows for a distance to be measured and determined. For example, the ruler's rigid material is an alloy, a metal, a plastic, wood or a composite material. The rigid materials are manufactured by extruding, machining or other methods.

Figure 6:
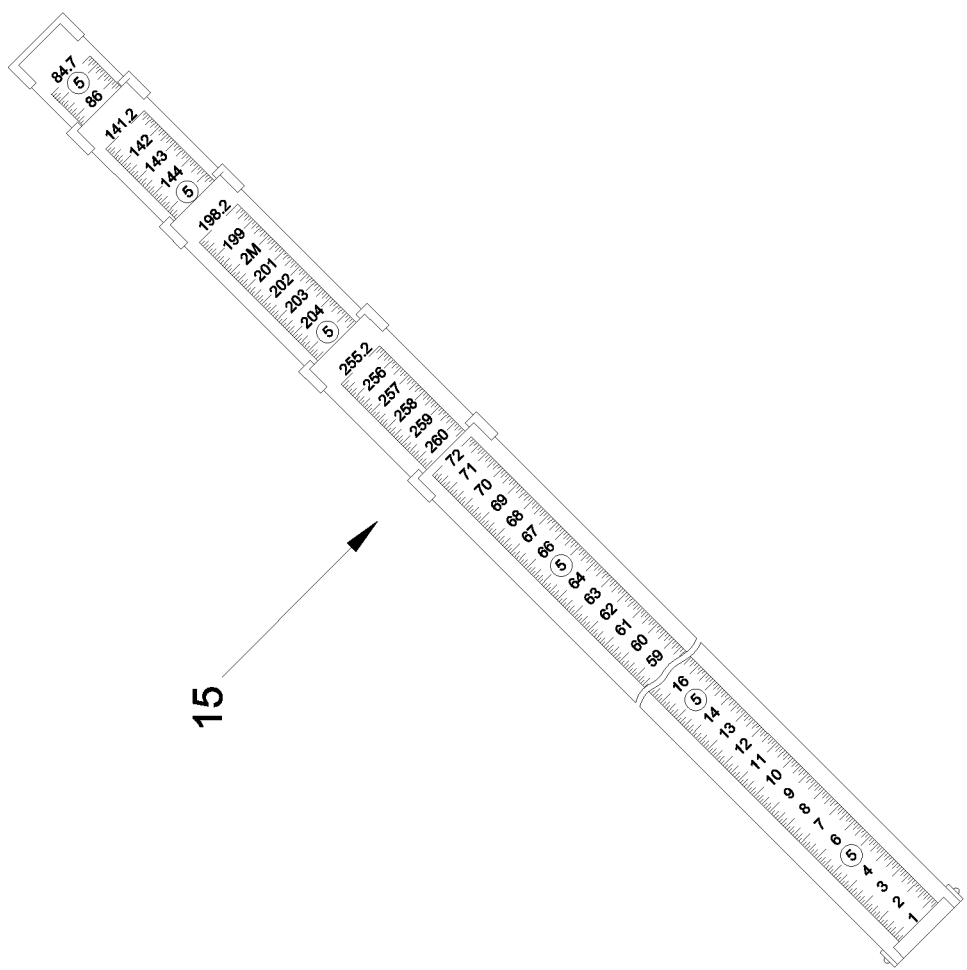
FIG. 6 is a perspective view of the structural illustration of a telescoping structure of the ruler.

The ruler has a fixed length as illustrated in FIG. 1 or has a telescopic structure 15 as illustrated in FIG. 6. The fixed length of the ruler is 48 inches but can be shorter or longer than 48 inches due to the use of the device. Similarly, the ruler can telescope from a length of a few inches up to ten feet.

The plurality of measuring holes formed in the ruler have threads 6 on the inner surface of the measuring holes or the measuring holes can have a smooth (i.e. do not have threads) inner surface.

The plurality of measuring holes formed in the ruler are spaced apart from one another. The spacing of the plurality of measuring holes have a uniform spacing or have variable spacing. For example, with a uniform spacing of the plurality of measuring holes, the distance from the center of one measuring hole to the center of an adjacent measuring hole is ¼ inch or can be smaller or larger depending on the needed application. If the spacing of the plurality of measuring holes is variable, then the distance from the center of one measuring hole to the center of an adjacent measuring hole is ¼ inch or can be smaller or larger depending on the needed application and another distance between two different adjacent measuring holes is ⅛ inch or can be smaller or larger depending on the needed application.

Figure 7:
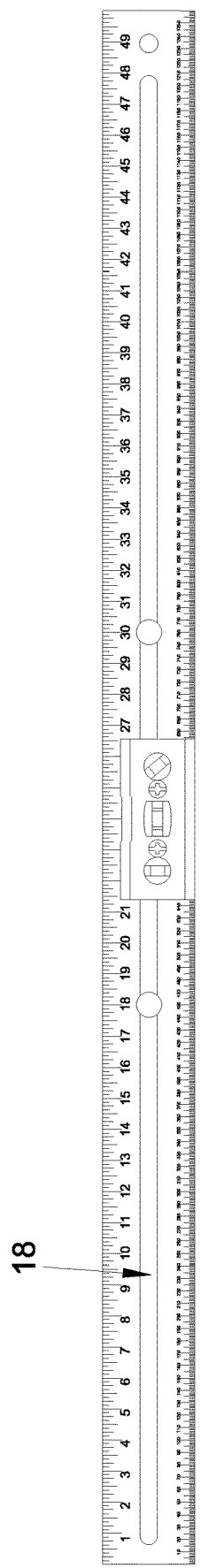
FIG. 7 is a perspective view of the structural illustration of the measuring holes being only one guiderail aperture.

As illustrated in FIG. 7, the measuring holes being only one guiderail aperture 18 whereby the pins may slide and lock into place and the pins can then be put in contact with the wall or surface and leave either a physical mark or a colored or darkened mark.

The ruler markings are in inches, millimeters, centimeters or any other measurement system.

In one embodiment, material of the ruler is present between each of the plurality of measuring holes.

The leveling device attached to the ruler is a bubble leveler, a laser leveler or another type of leveler. The leveling device is attached to the ruler with a screw or screws 14, a rivet or rivets or other fastener(s) fastened into fastening hole(s) 7 in the ruler.

The fastening hole or fastening holes have threads 8 on the inner surface or have a smooth (i.e. do not have threads) inner surface.

In another embodiment, the leveling device is attached to the ruler with glue, adhesive, epoxy, a dove-tail connection or other fastening devices.

In another embodiment, the bubble leveler is one bubble level or a plurality of bubble levels 3. The plurality of bubble levels can have three bubble levels where one bubble level is horizontally positioned, another bubble level is vertically positioned, and the third bubble level has an angle relative to the horizontally positioned bubble level.

The angle relative to the horizontally positioned bubble level is 45 degrees or can be smaller or larger than 45 degrees depending on the application.

Each pin of the plurality of pins comprise a threaded or non-threaded pointed screw 9 and knob 10 attached to one end of the screw. The knob is integrally attached to one end of the screw or the knob has a female end attached to a male end of the screw. The knob has upper end 11 and lower end 12. The upper end of the knob has a diameter which is larger than a diameter of the lower end of the knob.

Figure 2:
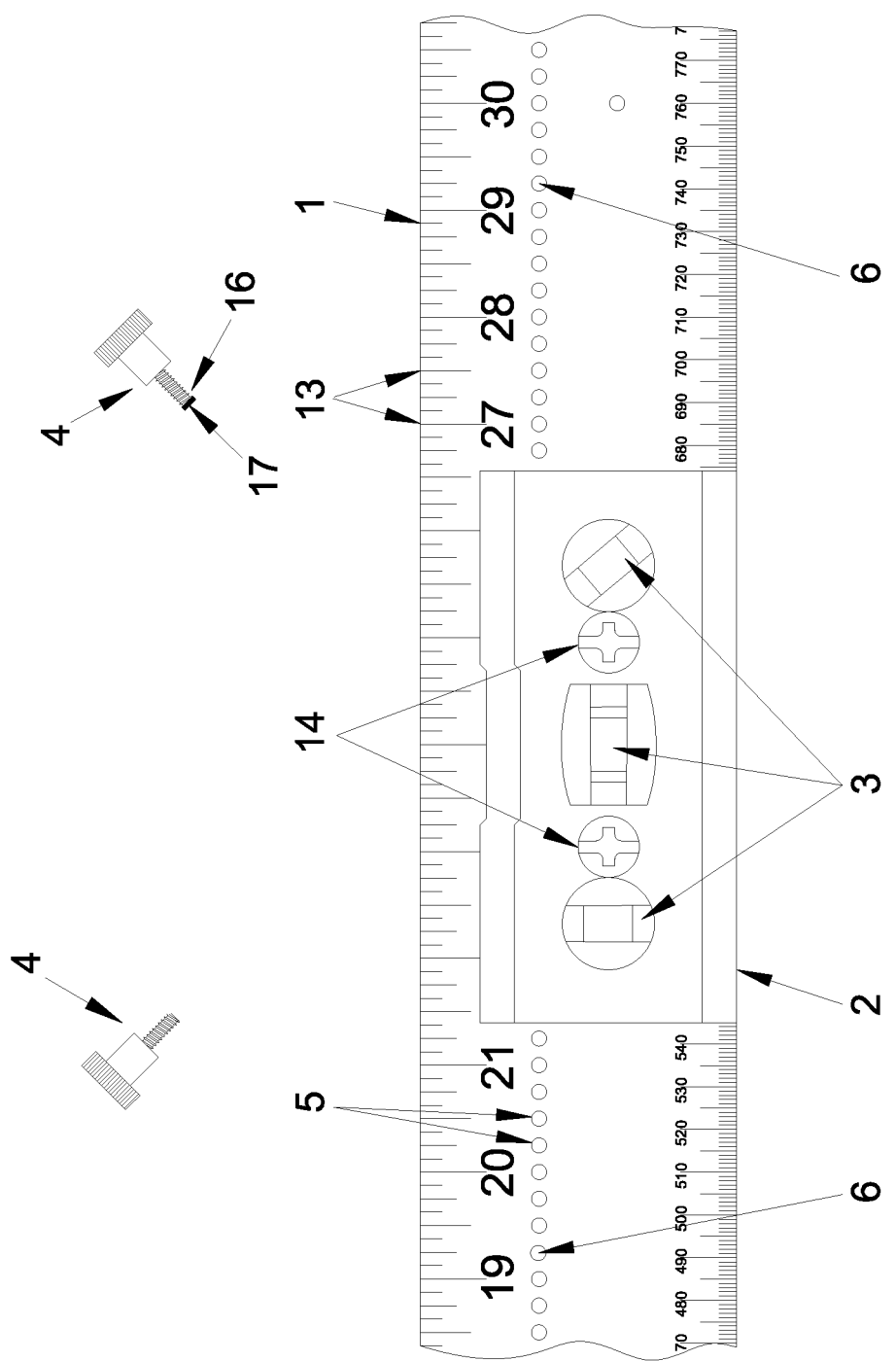
FIG. 2 is a top view of the structural illustration of a bubble leveler attached with screws to a ruler according to another embodiment of the present invention.
Figure 3:
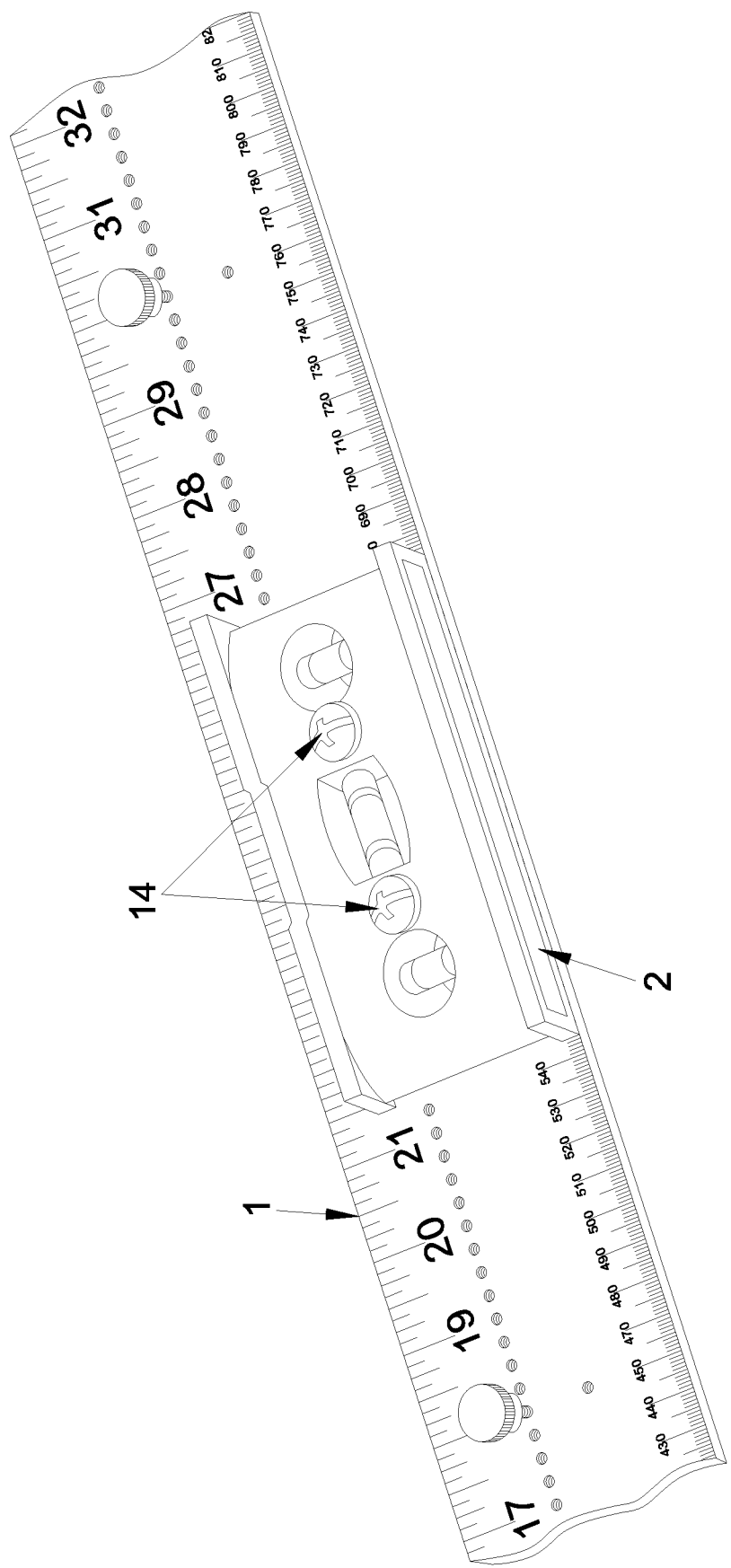
FIG. 3 is a perspective view of the structural illustration of a set of pins inserted in the measuring holes of the ruler according to another embodiment of the present invention.
Figure 4:
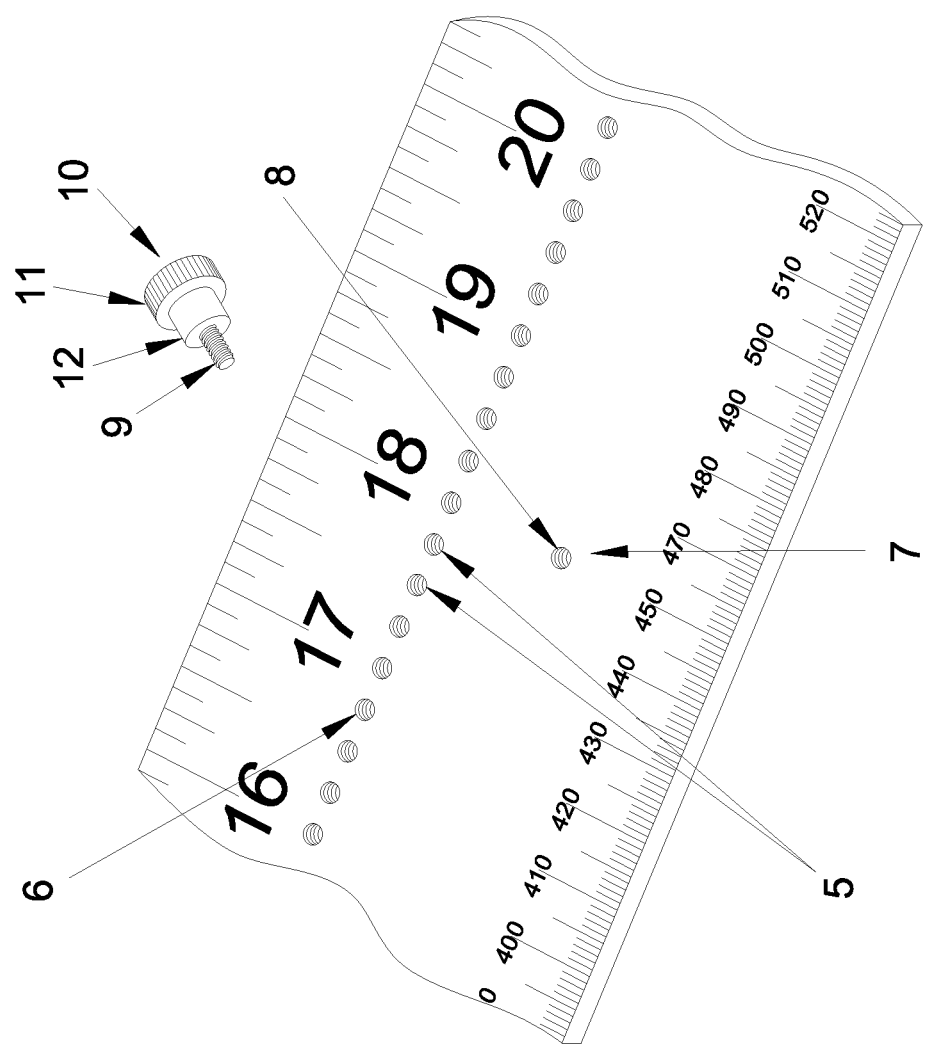
FIG. 4 is a perspective view of the structural illustration of threaded measures holes and a threaded fastening hole in the ruler and the pin having threads on the pointed screw according to another embodiment of the present invention.
Figure 5:
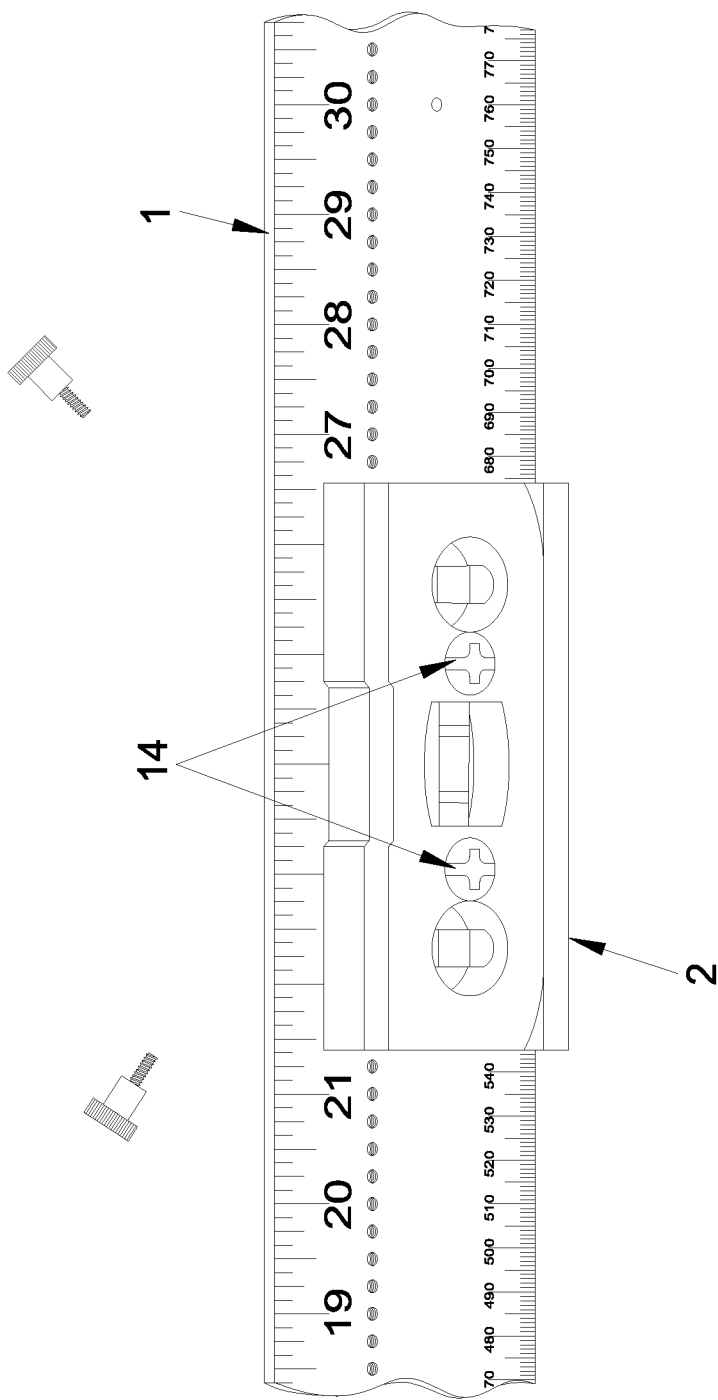
FIG. 5 is a perspective view of the structural illustration of smooth measures holes and screws inserted into the fastening holes in the ruler along with a set of pins according to another embodiment of the present invention.

As illustrated in FIG. 2, the tip 16 of the pins may have a means for marking 17 the wall or the surface of a structure so as to leave a colored or darkened mark on the surface of the wall or the surface of the structure. Some examples of the means for marking are lead, paint, graphite or other material for marking Therefore, one specific example of the device operating to hang level objects such as pictures, paintings and frames on a wall or on a surface of a structure is screwing the pin(s) threaded pointed screw 9 into threaded measuring hole(s) 5 until the threaded pointed screw makes contact with a surface of the wall or a surface of a structure such that the threaded pointed screw makes a visible mark/marking on the wall or the structure surface.

Since the present invention is designed to be simple and easy to use, the device may only consist of a ruler having measuring holes and a leveling device attached to the ruler.

What is claimed is:

1. A device comprising
a ruler,
a leveling device attached to the ruler and
at least one threaded pin;
wherein the ruler has a plurality of measuring holes and threads are provided on an inner surface of the ruler surrounding the measuring holes and the at least one threaded pin is inserted and threadably connected to one of the plurality of measuring holes; and
wherein the rule has fastening holes and the levelling device is attached to the rule with screws inserted into the fastening holes.

2. The device according to claim 1, wherein the ruler is made from a rigid material wherein the rigid material is selected from the group consisting of an alloy, a metal, a plastic, wood and a composite material.

3. The device according to claim 1, wherein the ruler has markings.

4. The device according to claim 1, wherein the plurality of measuring holes are spaced apart from each another and have a uniform spacing.

5. The device according to claim 1, wherein the plurality of measuring holes are spaced apart from each another and have a variable spacing.

6. The device according to claim 1, wherein a distance from a center of one of the plurality of measuring holes to a center of an adjacent measuring hole is ¼ inch.

7. The device according to claim 1, wherein the leveling device is a bubble leveler or a laser leveler.

8. The device according to claim 7, wherein the bubble leveler comprises three bubble levels.

9. The device according to claim 8, wherein a first bubble level is horizontally positioned, a second bubble level is vertically positioned, and a third bubble level is positioned at an angle relative to the first bubble level.

10. The device according to claim 9, wherein the angle relative to the first bubble level is 45 degrees.

11. The device according to claim 1, wherein the at least one threaded pin comprises a threaded pointed screw and a knob.

12. The device according to claim 11, wherein the knob is integrally attached to one end of the threaded pointed screw.

13. The device according to claim 12, wherein the knob has an upper end and a lower end.

14. The device according to claim 13, wherein the upper end of the knob has a diameter larger than a diameter of the lower end of the knob and a tip of the at least one pin has a means for marking.

15. The device according to claim 11, wherein the at least one pin comprises two pins, wherein the threaded pointed screw of each of the two pins are screwed into the measuring holes until each of the threaded pointed screw makes contact with a surface of a wall or a surface of a structure making a visible mark on the wall surface or the structure surface.

16. The device according to claim 1, wherein the ruler has a fixed length.

17. The device according to claim 1, wherein the ruler telescopes from a length of a few inches up to ten feet.

* * * * *